US010282748B2

(12) United States Patent
Opie et al.

(10) Patent No.: US 10,282,748 B2
(45) Date of Patent: May 7, 2019

(54) SYSTEM AND METHOD FOR MEASURING ADVERTISING EFFECTIVENESS

(71) Applicant: Datalogix Holdings, Inc., Redwood Shores, CA (US)

(72) Inventors: Robin Opie, Lafayette, CO (US); Audrey Lynn Thompson, Denver, CO (US); Damian Vallejo Wandler, Denver, CO (US); Donald Edward Hussen, Golden, CO (US)

(73) Assignee: Datalogix Holdings, Inc., Redwood Shores, CA (US)

( * ) Notice: Subject to any disclaimer, the term of this patent is extended or adjusted under 35 U.S.C. 154(b) by 674 days.

(21) Appl. No.: 14/486,172

(22) Filed: Sep. 15, 2014

(65) Prior Publication Data
US 2015/0006282 A1 Jan. 1, 2015

Related U.S. Application Data

(62) Division of application No. 13/771,627, filed on Feb. 20, 2013.

(51) Int. Cl.
*G06Q 30/02* (2012.01)
(52) U.S. Cl.
CPC ..... *G06Q 30/0246* (2013.01); *G06Q 30/0242* (2013.01)
(58) Field of Classification Search
CPC .................................................... G06Q 30/02
See application file for complete search history.

(56) References Cited

U.S. PATENT DOCUMENTS

| 5,111,395 | A | 5/1992 | Smith et al. |
| 5,499,359 | A | 3/1996 | Vijaykumar et al. |
| 5,819,291 | A | 10/1998 | Haimowitz et al. |
| 6,026,398 | A | 2/2000 | Brown et al. |
| 6,061,798 | A | 5/2000 | Coley et al. |
| 6,523,041 | B1 | 2/2003 | Morgan et al. |

(Continued)

OTHER PUBLICATIONS

Final Office Action dated Jun. 3, 2015 for U.S. Appl. No. 13/771,627, 18 pages.

(Continued)

*Primary Examiner* — Fonya M Long
*Assistant Examiner* — Thuy N Nguyen
(74) *Attorney, Agent, or Firm* — Invoke

(57) ABSTRACT

In some embodiments, a method defines a test group from a population of consumers that have been exposed to a communication associated with a promoted entity. The test group includes a (1) retailer profile, and (2) a first purchase amount associated with the promoted entity. The method also includes receiving purchase information associated with a third party. The purchase information includes (1) a second purchase amount associated with the promoted entity, and (2) a third purchase amount associated with the promoted entity. The method further includes defining a first multiplier based on a relationship between the first purchase amount and the second purchase amount, and defining a second multiplier based on a relationship between the first purchase amount and the third purchase amount. The method additionally includes sending a signal indicative of a combined multiplier based on (1) the first multiplier, and (2) the second multiplier.

19 Claims, 5 Drawing Sheets

(56) References Cited

U.S. PATENT DOCUMENTS

| | | | |
|---|---|---|---|
| 6,697,799 B1 | 2/2004 | Neal et al. | |
| 7,158,943 B2 * | 1/2007 | van der Riet | G06Q 30/02 705/14.41 |
| 7,257,596 B1 | 8/2007 | Williams et al. | |
| 7,461,263 B2 | 12/2008 | Prince | |
| 7,577,680 B1 | 8/2009 | Williams et al. | |
| 7,644,121 B2 | 1/2010 | Swanson et al. | |
| 7,904,337 B2 | 3/2011 | Morsa | |
| 7,912,865 B2 | 3/2011 | Akerma et al. | |
| 7,949,561 B2 | 5/2011 | Briggs | |
| 7,992,199 B1 * | 8/2011 | Winick | H04L 41/0806 709/225 |
| 7,992,210 B2 | 8/2011 | McKenna | |
| 8,074,882 B2 | 12/2011 | Dmitriev et al. | |
| 8,082,177 B2 | 12/2011 | Williams et al. | |
| 8,135,747 B2 | 3/2012 | Anzalone et al. | |
| 8,136,034 B2 | 3/2012 | Stanton et al. | |
| 8,185,437 B2 | 5/2012 | Altberg et al. | |
| 8,224,971 B1 | 7/2012 | Miller et al. | |
| 8,458,195 B1 | 6/2013 | Procopio | |
| 2002/0052925 A1 | 5/2002 | Kim et al. | |
| 2002/0077901 A1 | 6/2002 | Katz | |
| 2002/0082901 A1 | 6/2002 | Dunning et al. | |
| 2004/0024632 A1 | 2/2004 | Perry | |
| 2005/0071239 A1 | 3/2005 | Tormey et al. | |
| 2006/0155764 A1 * | 7/2006 | Tao | G06F 17/30867 |
| 2007/0033104 A1 | 2/2007 | Collins et al. | |
| 2007/0038516 A1 | 2/2007 | Apple et al. | |
| 2007/0124290 A1 | 5/2007 | Swanson et al. | |
| 2007/0199064 A1 | 8/2007 | Pueblas | |
| 2008/0103888 A1 | 5/2008 | Weir | |
| 2009/0132366 A1 | 5/2009 | Lam et al. | |
| 2009/0182702 A1 | 7/2009 | Miller et al. | |
| 2009/0198653 A1 | 8/2009 | Christianson et al. | |
| 2009/0204476 A1 | 8/2009 | Abraham et al. | |
| 2009/0216579 A1 | 8/2009 | Zen et al. | |
| 2009/0216641 A1 | 8/2009 | Hubbard | |
| 2009/0313463 A1 * | 12/2009 | Pang | G06F 17/30306 713/150 |
| 2010/0004980 A1 | 1/2010 | Bowen | |
| 2010/0094758 A1 | 4/2010 | Chamberlain et al. | |
| 2010/0223104 A1 | 9/2010 | Patel et al. | |
| 2010/0306043 A1 | 12/2010 | Lindsay et al. | |
| 2010/0325142 A1 | 12/2010 | Anzalone et al. | |
| 2011/0016042 A1 | 1/2011 | Cho et al. | |
| 2011/0060905 A1 | 3/2011 | Stack et al. | |
| 2011/0119126 A1 | 5/2011 | Park et al. | |
| 2011/0137721 A1 | 6/2011 | Bansal | |
| 2011/0202404 A1 | 8/2011 | van der Riet | |
| 2011/0231246 A1 | 9/2011 | Bhatia et al. | |
| 2011/0231257 A1 * | 9/2011 | Winters | G06Q 30/02 705/14.53 |
| 2012/0047366 A1 | 2/2012 | Yoo | |
| 2012/0059714 A1 | 3/2012 | Furman | |
| 2012/0072276 A1 * | 3/2012 | Stivers | G06Q 30/0273 705/14.17 |
| 2012/0078932 A1 | 3/2012 | Skurtovich et al. | |
| 2012/0089455 A1 | 4/2012 | Belani et al. | |
| 2012/0054189 A1 | 6/2012 | Moonka et al. | |
| 2012/0158574 A1 | 6/2012 | Skurtovich et al. | |
| 2012/0166272 A1 | 6/2012 | Wiley et al. | |
| 2012/0166520 A1 | 6/2012 | Lindsay | |
| 2012/0173374 A1 | 7/2012 | Soroca et al. | |
| 2012/0215610 A1 | 8/2012 | Amaro et al. | |
| 2012/0296735 A1 * | 11/2012 | Hari | G06Q 30/02 705/14.42 |
| 2013/0166377 A1 | 6/2013 | Kirkby et al. | |

OTHER PUBLICATIONS

Final Office Action for dated Feb. 11, 2016 for U.S. Appl. No. 13/771,627, filed Feb. 20, 2013, all pages.
Non-Final Office Action dated Oct. 2, 2015 for U.S. Appl. No. 13/771,627, 15 pages.
U.S. Office Action dated Feb. 26, 2013 for U.S. Appl. No. 13/644,736.
U.S. Office Action dated Sep. 12, 2014 for U.S. Appl. No. 13/771,627.
U.S. Final Office Action dated Feb. 5, 2014 for U.S. Appl. No. 13/771,627.
U.S. Office Action dated Sep. 26, 2013 for U.S. Appl. No. 13/771,627.
International Search report dated Sep. 19, 2014 for PCT/US2014/017319.

* cited by examiner

400

Defining a test group from a population of consumers that have been exposed to a communication associated with a promoted entity, the test group including (1) a retailer profile, and (2) a first purchase amount associated with the promoted entity
402

Receiving purchase information associated with a third party, the purchase information including (1) a second purchase amount associated with the promoted entity, and (2) a third purchase amount associated with the promoted entity
404

Defining a first multiplier based on a relationship between the first purchase amount and the second purchase amount
406

Defining a second multiplier based on a relationship between the first purchase amount and the third purchase amount
408

Sending a signal indicative of a combined multiplier based on (1) the first multiplier, and (2) the second multiplier
410

Define a test group from a population of consumers that have been exposed to an advertisement for a promoted entity, the test group including (1) a retailer profile, and (2) a first purchase amount associated with the promoted entity
502

Define a control group from a population of consumers that have not been exposed to the advertisement for the promoted entity, the control group including (1) the retailer profile, and (2) a second purchase amount associated with the promoted entity
504

Receive purchase information associated with a third party, the purchase information including (1) a third purchase amount associated with the promoted entity, and (2) a fourth purchase amount associated with the promoted entity
506

Define a first multiplier based on a relationship between the first purchase amount and a third purchase amount
508

Define a second multiplier based on a relationship between the first purchase amount and the fourth purchase amount
510

Send a signal indicative of a combined multiplier based on (1) the first multiplier, and (2) the second multiplier
512

FIG. 5

SYSTEM AND METHOD FOR MEASURING ADVERTISING EFFECTIVENESS

CROSS-REFERENCE TO RELATED APPLICATIONS

This application is a divisional of U.S. patent application Ser. No. 13/771,627, filed Feb. 20, 2013, and entitled "System and Method for Measuring Advertising Effectiveness" the disclosure of which is incorporated by reference herein in its entirety.

BACKGROUND

Some embodiments described herein relate generally to methods and apparatus for measuring advertising effectiveness.

Over the past sixty years, television has been the dominant platform for brand advertising. Consumer purchase behavior studies have demonstrated that television creates immense value by increasing consumer awareness of and loyalty to brands and/or retailers. In doing so, television ultimately increases sales and gives marketers confidence that their investment has generated hard value.

In digital media, online impressions such as clickable advertisements can be tied to online purchases of specific products and/or through specific retailers with relatively little effort. Consequently, it has been easy to establish that internet advertising is effective for direct response and for targeting 'almost ready to buy' consumers, when consumers complete the majority of their transactions online. However, the large majority of American consumer purchases are still made in-store, and online sales represent a small portion of the US market. While internet advertising is pervasive, the ability to link internet advertisement exposure with offline purchase behavior in a meaningful way has remained elusive. Without a clear realization of the sales value that internet advertising can create, advertisers will continue to have difficulty justifying significant investment in digital media.

A need exists, therefore, for methods and apparatus for measuring advertising effectiveness.

SUMMARY

In some embodiments, a method includes defining a test group from a population of consumers that have been exposed to a communication associated with a promoted entity. The test group includes a (1) retailer profile, and (2) a first purchase amount associated with the promoted entity. The method also includes receiving purchase information associated with a third party. The purchase information includes (1) a second purchase amount associated with the promoted entity, and (2) a third purchase amount associated with the promoted entity. The method further includes defining a first multiplier based on a relationship between the first purchase amount and the second purchase amount, and defining a second multiplier based on a relationship between the first purchase amount and the third purchase amount. The method additionally includes sending a signal indicative of a combined multiplier based on (1) the first multiplier, and (2) the second multiplier.

BRIEF DESCRIPTION OF THE DRAWINGS

FIG. 4 is a flow chart illustrating a method according to an embodiment.

FIG. 5 is a flow chart illustrating a process of a processor executing code, according to an embodiment.

DETAILED DESCRIPTION

Figure 1:
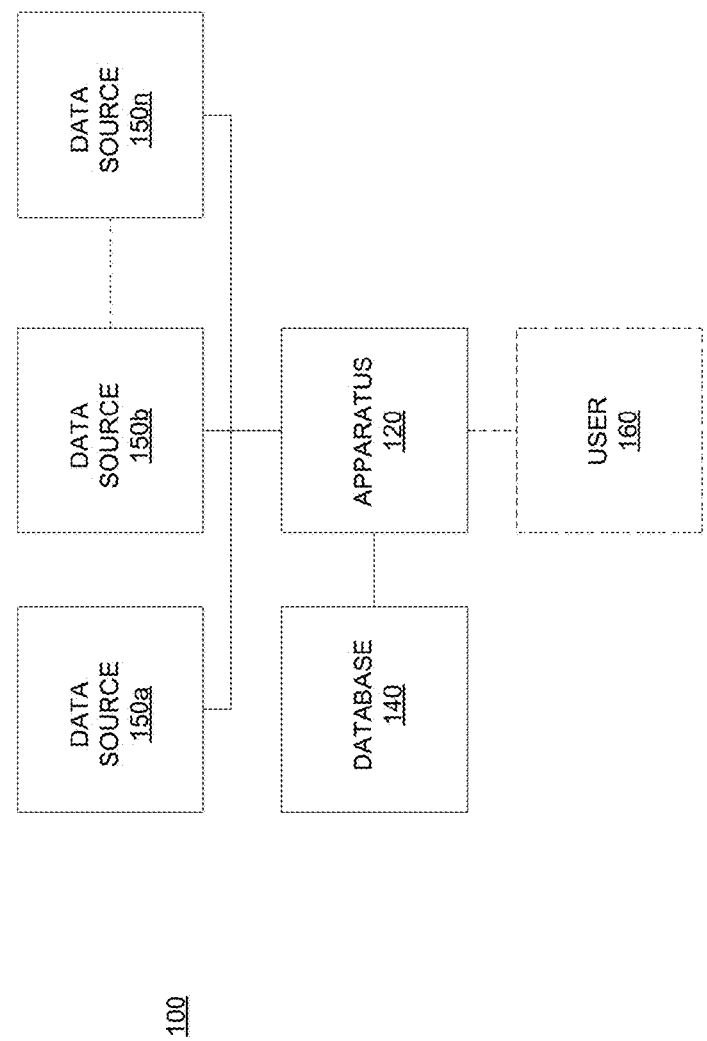
FIG. 1 is a schematic illustration of a system according to an embodiment.

In some embodiments, a method includes defining a test group from a population of consumers that have been exposed to a communication. In some embodiments, the communication is associated with a promoted entity. The promoted entity can be any suitable entity being advertised such as, but not limited to, a product, a class of products, a particular brand of a product, a retailer, a manufacturer, a group such as a trade association or a non-profit organization, a service, and/or the like. In some embodiments, the promoted entity is a particular brand of a product. In some embodiments, the promoted entity is a retailer.

The test group can include a retailer profile and a first purchase amount associated with the promoted entity. The method includes receiving purchase information associated with a third party. The purchase information can include a second purchase amount associated with the promoted entity and a third purchase amount associated with the promoted entity. A first multiplier is defined based on a relationship between the first purchase amount and the second purchase amount, and a second multiplier is defined based on a relationship between the first purchase amount and the third purchase amount. A signal is sent that is indicative of a combined multiplier based on the first multiplier, and the second multiplier.

In some embodiments, the method also includes defining a control group from a population of consumers that have not been exposed to the communication. The control group can include the retailer profile and a fourth purchase amount associated with the promoted entity. An initial effectiveness value is determined based on the first purchase amount and the fourth purchase amount. A signal is then sent that is indicative of a final effectiveness value, where the final effectiveness value is based on the initial effectiveness value, and the combined multiplier.

While described herein (for simplicity) as a communication of a promoted entity that can potentially result in a transaction/purchase, it is understood that aspects of the invention are not limited to such embodiments, and are generally applicable to any communication that can potentially result in related online and/or offline activity of interest. For example, the communication can be an awareness campaign seeking donations, and the tracked activity can be related donations. In another example, the communication can be a petition, and the tracked activity can be sign-ups for the petitions. In yet another example, the communication can be for an event, and the tracked activity can be registrations for the event.

As used herein, a module can be, for example, any assembly and/or set of operatively-coupled electrical components, and can include, for example, a memory, a processor, electrical traces, optical connectors, software (executing in hardware), and/or the like. As used herein, the singular forms "a," "an" and "the" include plural referents unless the context clearly dictates otherwise. Thus, for example, the term "a record database" is intended to mean a single database or a set of databases with similar functionalities.

Furthermore, as described herein, an entity, for example a business entity associated with a computing device, can be a marketing entity, a website and/or website operator, an online and/or an offline store, a data analytics entity, etc.

FIG. 1 is a schematic illustration of an environment/ system 100 within which aspects of the invention can be implemented, according to an embodiment. As shown in FIG. 1, the system 100 can include an apparatus 120 and a database 140. The apparatus 120 (and optionally, the database 140) can be connected to one or more data sources 150a, 150b . . . 150n. The apparatus 120 and/or the system 100 can be controllable by a user 160. Hence, it is understood that the user 160 can be external to the system 100, as also illustrated by the use of dashed lines to designate the user 160 and the user's connectivity to the apparatus 120. As described below, the apparatus 120 can be configured to measure advertising effectiveness.

The various components of the system 100 can be in communication (as indicated by lines in FIG. 1) via a network, which can be any type of network (e.g., a local area network or LAN, a wide area network or WAN, a virtual network, a telecommunications network, and/or the internet), implemented as a wired network and/or a wireless network. Any or all communications can be secured (e.g., encrypted) or unsecured, as is known in the art. Each of the apparatus 120, database 140, data sources 150a-n, and the user 160 can encompass a personal computer, a server, a database, a work station, a mobile device, a cloud computing environment, an application or a module running on any of these platforms, and/or the like. Additionally, it is understood that the user 160 can be any suitably representative human entity interacting with the apparatus 120, such as an actual person, an employee, and so on.

In some embodiments, at least some aspects of the apparatus 120, the database 140, and the data sources 150a-n can be commonly implemented on the same device, and/or can be commonly owned. In some embodiments, at least one of the data sources 150a-n can be a third party entity with respect to the apparatus 120.

In some embodiments, the data sources 150a-n can provide data suitable for determining effectiveness of online advertisements (e.g. for a specific advertising campaign). In other words, the data sources can provide advertising data and transaction data for the one or more promoted entities, including all relevant associated information (e.g. retailer information, customer demographics, and/or the like). In some embodiments, the promoted entity is a product and/or retailer, and the data sources 150a-n can provide household data associated with one or more of the following: a mass channel population, an advertising campaign population, a drug channel population, a grocery channel population, a supercenter channel population, and/or the like. In some embodiments, the data sources 150a-n can directly provide channel data for the one or more promoted entities, such as might be sourced directly from a manufacturer, distributor and/or any distribution chain entity for a product, for example. In some embodiments, the data sources 150a-n can provide transaction data, which can be point-of-sale based, and/or which can be at the stock keeping unit (SKU) level.

In some embodiments, an entity such as a retailer can employ aspects of the system 100 described herein to determine effectiveness of online advertisements run by or for another entity; for example, the promoted entity can be a competitor of the retailer or a product of the retailer, and/or can be otherwise related to the retailer (e.g. a sister company, an acquired company, a potential acquisition target, and/or the like). In some embodiments, the retailer can determine effectiveness of an online advertisement that targets customers of a competitor. For example, the target customer may be one that has never purchased from the retailer but has purchased at least once from the competitor, one that has comparatively purchased to a greater extent from the competitor than the retailer, and/or the like. In this manner, the retailer can determine, using aspects of the system 100, if such customers modify their purchasing behavior based on the online advertisement with respect to a specific competitor, such as by, for example, switching their purchasing from the competitor to the retailer, maintaining purchases at the competitor but purchasing from the retailer at least once (i.e. 'trying' the promoted entity), and so on.

Figure 2:
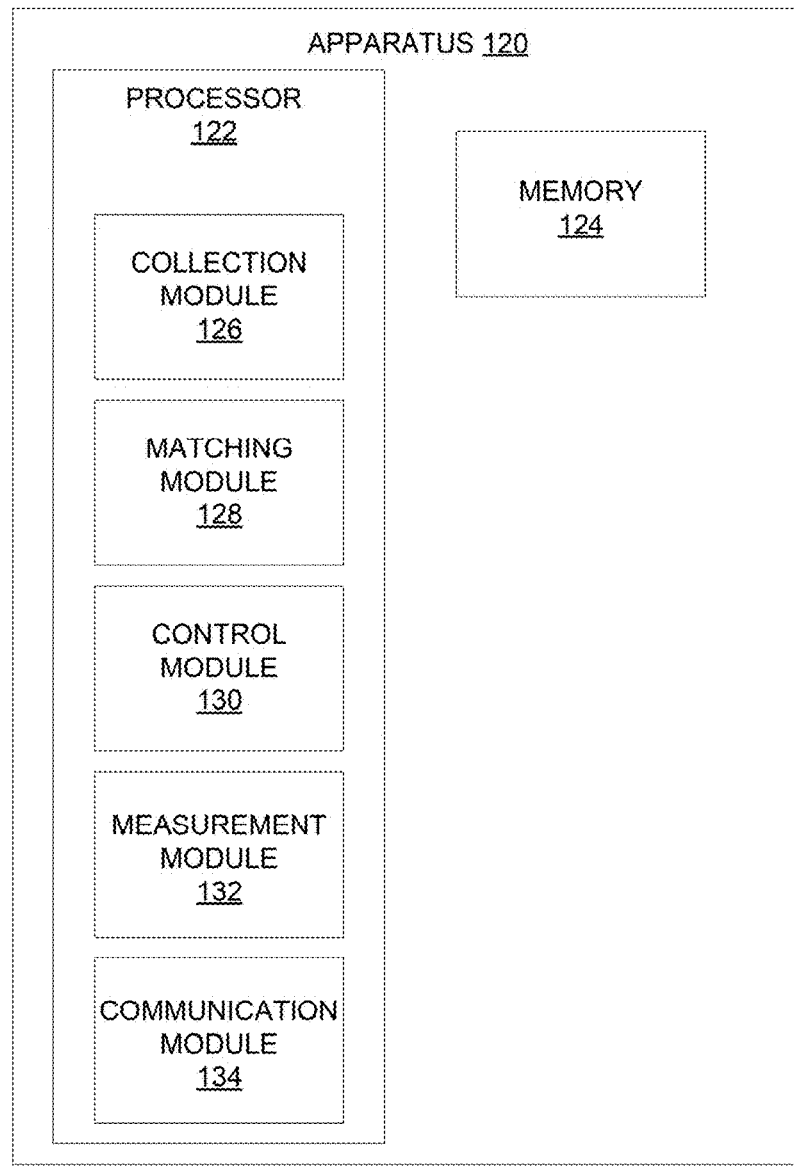
FIG. 2 is a block diagram of the apparatus 120 of FIG. 1, according to an embodiment.

FIG. 2 illustrates details of the apparatus 120, which includes at least a processor 122 and a memory 124. The processor 122 includes at least a collection module 126, a matching module 128, and a measurement module 132. The processor 122 can also include a communications module 134 for establishing and managing network connectivity of the apparatus 120 within the system 100. The processor 122 can also include a control module 130 for manipulating aspects of the apparatus 120 and/or any of the other modules described here, such as by the user 160. For example, the user 160 could specify that only the data sources 150a and 150b be used, could specify the location of the database 140, and so on. It is to be understood that the each of the modules may be in seamless communication with each other module.

The collection module 126 is configurable to collect data from the data sources 150a-n, and is further configurable to populate the database 140 with the collected data. In some embodiments, all personally identifiable information (PII) can be removed, converted, or otherwise rendered undeterminable in the collected data prior to or after storage. In some embodiments, the PII can be removed by the collection module 126 consistent with one or more privacy regulatory standards or guidelines, including those established by Direct Marketing Association, Interactive Advertising Bureau, Digital Advertising Alliance, and Network Advertising Initiative. In some embodiments, the collected data can include at least campaign data and transaction data. The campaign data can include household information and campaign information associated with the household information, such as the date and type of campaign. The transaction data can include sales information and other customer information.

In some embodiments, collection module 126 is further configurable to receive and store household (HH) information for one or more households from the data sources 150a-n in the database 140. The household information can be received by the collection module 126 in isolation or in conjunction with advertising campaign data, with transaction, data, and/or the like. In this manner, aspects of the invention can build up an extensive collection of household information over time, gleaned from potentially millions of transactions and online advertisement campaigns. The collection module 126 is further configurable to generate and assign a unique HH identifier (HHID) to information associated with each household. The HHID can be generated in any suitable manner. In some embodiments, the HHID can be generated as a function of the PII. In some embodiments, the HHID can be a hashed attribute string that is generated as disclosed in U.S. patent application Ser. No. 13/644,736 filed Oct. 4, 2012 ("the '736 application"), titled "METHOD AND APPARATUS FOR MATCHING CONSUMERS", the disclosure of which is incorporated herein in its entirety by reference.

The HH information for each household can include (but is not limited to) income, net worth, children indicators, a segment membership (e.g. lifestyle, buyer, etc.), spending information, one or more digital activity metrics, the HH identifier (HHID) and/or the like. The digital activity metric can be any suitable measure of online activity such as browsing history, online purchases, and/or the like. Since the HHID can uniquely identify a single household, it can accordingly be used for association with advertising campaign data, as well as with transaction data. In this manner, even though the collected transaction data have all PII removed, they can still be linked via the associated HHIDs.

In some embodiments, the received campaign data and the received transaction data can already have associated HHIDs. For example, when the transaction data corresponds to a purchase made by a customer at a specific retailer with a retailer's loyalty card that is associated with a loyalty account of the customer with the retailer, the transaction data can include the customer information based on the customer's loyalty account. The retailer and/or the matching module 128 can then match the customer and the transaction to an HHID.

The matching module 128 is configurable to match the received campaign data and the received transaction data in any suitable manner. In some embodiments, a matching process similar to that described in the '736 application, and briefly reiterated here, can be employed. In some embodiments, the matching module 128 is configurable to generate one or more first identification strings from the campaign data that uniquely identify a user associated with the campaign data, and to generate one or more second identification strings from the transaction data that uniquely identify a user associated with the transaction data. For example, if the campaign data is associated with a user named 'John Smith', one of the first identification strings can be 'John Smith', 'Jon Smith', 'Johnny Smith', 'Johnnie Smith', and so on. As another example, if the transaction data is associated with a user named 'John Smith' buying in Chicago, one of the first identification strings can be a combination of the name and location, such as 'SmithChicago', 'SmithChicagoIL', and so on. Each identification string can be, for example, a text string, a number, a code, a symbol, and/or combinations thereof.

In some embodiments, the received campaign and transaction data can already include the first and second identification strings, respectively. In some embodiments, the received campaign and transaction data can be encrypted; in other words, the first and second identification strings can be encrypted, either with the same encryption key or with different encryption keys. For example, as described in detail in the '736 application, the same hash function can be employed for generating hashed first and second identification strings. The first and second identification strings (encrypted or unencrypted) can then be compared, and a match can be deemed to exist when at least one of the first identification strings matches with at least one of the second identification strings, although it is understood that more than one match may be desirable and/or required. A match can be indicative of similar underlying data, and of the likelihood that the matched campaign data and transaction data are associated with the same entity, such as a household.

Separating the functionality of the collection module 126 and the matching module 128 can provide benefits for privacy of data, where the matching module may not directly interact with the data sources 150a-n, and where the collection module can remove PII and can replace it with HHIDs from the collected data prior to matching by the matching module. In some embodiments, however, the functionality of the collection module 126 and the matching module 128 can be combined, or overlap.

Figure 3:
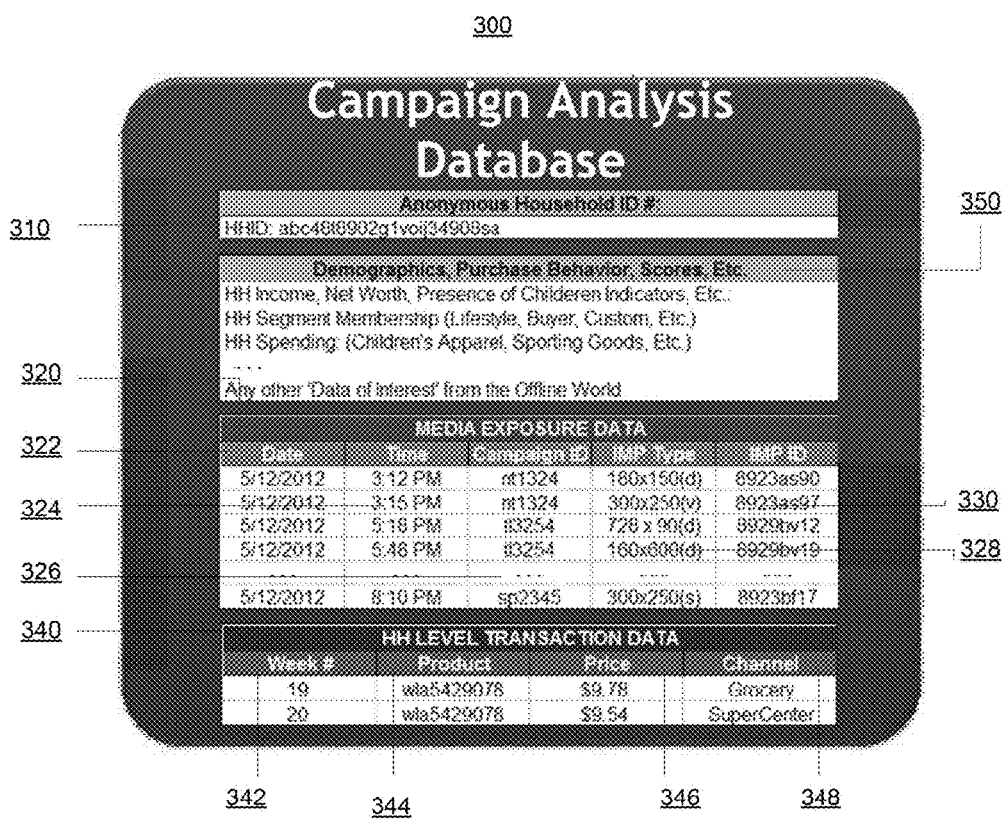
FIG. 3 is an exemplary entry in the database 140 of FIG. 1, according to an embodiment.

The combined activity of the collection module 126 and the matching module 128 can populate the database 140 with any suitable information, such as may be specified by, for example, the user 160 via the control module 130. FIG. 3 illustrates an exemplary entry 300 in the database 140 for a single HHID that includes campaign data as well as transaction data associated therewith. Each entry includes an HHID 310, as well as campaign data ('media exposure data') 320, transaction data 340 associated with the HHID. The campaign data 320 includes a date 322 and time 324 of exposure to the campaign (e.g. when exactly did the customer view the campaign advertisement), an identifier 326 for the campaign, an impression type 328 and an impression identifier 330. The impression type can be specified in any suitable manner, and in some embodiments, is a specification of image resolution, rendering location (e.g. on a third party website and/or application), format, and/or the like. For example, as illustrated in FIG. 3, 'v' can correspond to video such as an AVI video or a Flash video, 'd' can correspond to digital and can encompass digital banners, 's' can correspond to a social media impression, and so on. In some embodiments (not shown), the impression type may convey further details of the rendering location(s), such a specification of a platform (e.g. mobile device), or a location within a web page (e.g. on a web feed, or on a right hand side (RHS) banner as is commonly employed for advertising space in web page design), and/or the like. The transaction data 340 can be product specific, and includes a specification of a time 342 associated with the transaction.

It is understood that while FIG. 3 illustrates the time 342 as the week# of the campaign, any suitable timestamp information associated with the transaction is possible, including exact time, day, date, and/or the like. In some embodiments, the granularity of time information available as time 342 for each transaction can be based on a contractual agreement with the source of the campaign data 320, based on a data privacy standard, and/or the like.

The transaction data 340 of FIG. 3 can also include a product identifier 344, the amount 346 spent on the product, and the retailer profile or source 348 of the particular transaction for the product (e.g. a grocery channel). Each entry can also include, for each HHID, any other information 350 of interest for that HHID, such as might be received and/or gleaned from demographic databases, income databases, and/or the like, as illustrated.

Referring again to FIG. 1, the measurement module 132 is configurable to utilize the database 140, which has been populated from the data sources 150a-n as described above, to determine effectiveness of an advertising campaign. In general, after an advertising campaign is complete, all households can be classified as exposed households and remaining, unexposed households. Exposed households (also referred to as an 'exposed group') can be ones that were successfully targeted. For example, a targeted household can be deemed exposed when the campaign was rendered to at least one household member, such as a sidebar advertisement during the member's use of a social media website. In another example, the targeted household is deemed exposed if the user interacts with the advertisement, such as by clicking on it. Accordingly, in some embodiments, an unexposed household can be one that was targeted but none of the household members saw and/or interacted with the campaign. In some embodiments, the unexposed households can include households that were not targeted.

In some embodiments, the measurement module 132 is configurable to select a subgroup or 'control group' from the unexposed households that is representative of the exposed group based on certain matching or alignment characteristics. In some embodiments, an unexposed household can be selected for the control group based on or more of the following aspects/characteristics associated with each household profile: target demographics, platform usage, pre-campaign period transaction data filtered by promoted entity and/or channel, and/or the like. In some embodiments, an unexposed household can be selected for the control group based on transaction data that is acquired from a particular data source (e.g. the data source 150a), which can correspond to a specific retailer, or data partner with whom a contractual relationship exists. Said another way, the control group can be 'aligned' and/or otherwise matched with the exposed group based on these 'alignment' characteristics. In this manner, bias and differences in transaction behavior across exposed and unexposed households can be accounted for. In some embodiments, the alignment characteristics included in the matching process can be demographics, platform usage, prior transaction behavior, presence of transactions with various retail partners, and/or media consumption (e.g., Internet) activity.

In some embodiments, the control group can be predetermined, i.e., is known before the campaign is run, and includes households that match campaign target criteria but are deliberately not exposed to the campaign. In some embodiments, the control group can be determined by a clustering approach, where matching, unexposed households are further sub-grouped based on what are considered the most important of the alignment characteristics. In some embodiments, a control group of unexposed households can be selected by aligning or matching each exposed household to an unexposed household based on the abovementioned alignment characteristics. In some embodiments, the alignment between exposed and unexposed households to select a control group can be achieved by using a logistic regression model to identify unexposed households that are similar to exposed households. The regression model can be used to estimate the likelihood (i.e. a score, such as a propensity score) that an unexposed household would have been targeted with the campaign based on the alignment characteristics. The use of a regression model can be employed to find a control group with similar characteristics to the exposed group, where the control group and the exposed group may or may not otherwise precisely match on any particular alignment characteristic. Said another way, since households with similar scores share similar alignment characteristics, it follows that choosing a group of unexposed households that show the same distribution of scores observed for the exposed group can ensure that the alignment characteristics across the exposed and control groups are similar, and thus that the control group is representative of the exposed group.

In some embodiments, the control group can be selected in the following manner: all the households in the database 140 can be partitioned into mutually exclusive and equally sized strata, where the stratification is score based. Next, within each stratum, unexposed households can be randomly sampled to obtain a constant ratio of exposed to unexposed households. The random sampling can be repeated any suitable number of times within each stratum to produce a group of control group candidates. The candidate that best represents the exposed group statistically (e.g., a candidate with the minimum Euclidean distance between the means of the variables from the exposed group and the candidate) can be chosen as the control group. In this manner, score distributions can be synchronized across exposed and control households, and a control group can be suitably selected corresponding to each exposed group for each score grouping.

Still referring to the measurement module 132, in some embodiments, the control group can be determined by a combination/hybrid of the various approaches detailed above. For example, the control group can be determined by using a hybrid clustering/regression model approach. Using this approach, the most important of the alignment characteristics can be the basis to partition the unexposed households into distinct clusters or strata. Within each stratum, a model can then be used to further partition the cluster into subgroups and match on the remaining characteristics by appropriately weighting the unexposed households. This hybrid approach can allow a relatively more precise match based on the most important alignment characteristic(s), while maintaining a high quality match on the remaining alignment characteristics, and while still ensuring that, in aggregate, the control group is still representative of the exposed group.

In some embodiments, the measurement module 132 is configurable to perform one or more diagnostic assessments on the determined control groups for statistical soundness. For example, in some embodiments, the balance of covariates can be evaluated between the test and control groups. In some embodiments, where households in control groups are stratified (described earlier), checks can be performed to ensure that the number of households in each strata are identical, or within a certain tolerance. In some embodiments, the measurement module 132 is configurable to perform one or more diagnostic modifications on the determined control groups, including, but not limited to, removing outlier households, an/or removing entire strata if no suitable match is found with the exposed group. Further, in some embodiments, the measurement module 132 is configurable to perform one or more diagnostic modifications on the exposed group(s) to ensure that a satisfactory match can be made between the exposed and control groups. For example, exposed households that can't be represented in the 'unexposed' groups can be removed, such as outliers (i.e. exposed households that spent more than the largest spender in the control group, exposed households that spent less than the lowest spender in the control group, and so on). In another example, entire strata may be removed from the exposed groups that appear to be outliers (e.g. strata where the exposed household spending is consistently 2% higher than for the corresponding unexposed households)

In some embodiments, once the control group is constructed, the measurement module 132 is further configurable to measure the effectiveness of the advertising campaign. In some embodiments, an analysis of covariance (ANCOVA) approach can be used to predict post-campaign spending at the household level. Generally, covariance is an estimate of the strength of relationship between variables of interest ("covariates") that can change together, while controlling for other variables that are not of primary interest. When performing ANCOVA in embodiments of the invention, the covariates can be related to, and selected from, one or more of demographics, pre-period transaction behavior, data-partner-match status (i.e. the data source), online activity, campaign exposure, and/or the like. ANCOVA can compensate for all other known data (e.g. demographics, pre-period transaction behavior, data partner match status, online activity, and/or the like) such that the difference between the exposed group and the control group can be essentially the difference in post-campaign spending for a "typical" (average) household in the test group vs. a "typical" (average) household in the control group. Using this "predicted" post-campaign spending, a revenue increase or 'measured revenue lift' can be calculated between each exposed group and its corresponding control group. The spending may be specified in any suitable manner, including, but not limited to, units of sale, units sold and/or amount spent per visit made by the consumer to the retailer, cost per unit to the consumer, and/or the like. In some embodiments, the measured revenue lift per household can be calculated by taking the difference in the least squares means of the exposed group and the control group.

Having described measured revenue lift, and referring to the earlier discussion of diagnostic assessments, it follows that some diagnostic assessments can ensure that there is no measurable difference between the exposed group and its corresponding (proposed) control group at some point prior to the campaign. For example, one can ensure that there is no statistically significant measured revenue lift between the exposed group and the control group prior to the advertising campaign, say a day before the campaign. A result to the contrary can be indicative of faulty control group construction As another example, when the households of the control group have been exposed to another campaign different from the campaign of interest, one can ensure that the responsiveness of the control group to the other campaign is accounted for when determining effectiveness of the campaign of interest; such determination(s) can include accounting for measured revenue lift due to the other campaign prior to and/or during the campaign of interest. Another form of diagnostic assessment can be to ensure there is no measurable/significant difference between the exposed group and its corresponding (proposed) control group for purchasing related to at least one other entity different from the promoted entity. A result to the contrary can be indicative of faulty group construction, i.e. of biased groups. It is understood that such an assessment can be made for a single campaign of a single promoted entity vs. multiple other entities, for multiple campaigns of the promoted entity in a manner as described above, and so on. The determination of what constitutes a measurable/significant difference can also be made in any suitable manner. In some embodiments, no measurable/significant difference exists if the measured revenue lift for the other entity/entities has a mean value within a specified tolerance about 0.0, a variance within a specified tolerance about 0.0, and/or the like.

It is understood that aspects of the invention are configurable in more complex campaign settings, and can be applied for more nuanced analysis than per household. For example, in some embodiments, the campaign can have served multiple ad types (e.g. video, audio, graphic, etc.), a different number of impressions for each ad type and/or for each advertising location (e.g. on a social media website, on a smartphone application, etc.), and/or targeted different demographics with different advertisements (e.g., male vs. female, urban vs. rural areas, etc.). The measurement module 132 is configurable to measure the revenue lift for each ad type (e.g. based on the impression type field 328 in FIG. 3), for each advertising location, for each impression (including a marginal value for each successive impression of multiple impressions aimed at the same household), for different advertising/impression content (e.g. different advertisements for the same promoted entity appealing to varying demographics), for each retailer (even when the promoted entity can be other than a retailer, such as a product), within each demographic of interest and/or across demographics of interest (e.g. regular buyers, and/or buyers switching to the promoted entity upon exposure to the campaign), and/or the like. In some embodiments, groups of interest can be defined by using the clustering approach described earlier. In some embodiments, the measurement module 132 is configurable to determine what component or percentage of the revenue lift arose from increased purchasing (that the campaign is directed to) by preexisting consumers of the promoted entity, e.g. of a product, vs. from first-time purchases of the product by new consumers acquired due to the campaign. In some embodiments, when the promoted entity is a retailer, the measurement module 132 is configurable to determine revenue lift for the retailer across all transactions conducted at the retailer post-campaign.

In some embodiments, the measurement module 132 is further configurable to account for unobserved transactions made by the exposed households. Unobserved transactions can include purchases made with cash, purchases made with non-partner entities, and/or any purchase not provided to the system 100 via data sources 150a-n, and that are thereby difficult to trace. Traceable transactions, on the other hand, can refer to any transaction other than one conducted solely by cash, such as by loyalty cards, gift cards, credit/debit cards, smartphone-based applications, virtual currency, transactions paid in cash where identifying information is manually entered or scanned, and/or the like. In some embodiments, accounting for unobserved transactions can be accomplished by scaling the revenue lift with a factor-up value that is representative of how much purchasing activity was captured via data sources 150a-n as compared to the amount of uncaptured purchasing activity that occurred at the household level. In some embodiments, the factor-up value can be a function of an outlet factor-up value and/or a channel factor-up value.

In some embodiments, the factor-up value can be derived by comparing the following data: (I) the observed/known average purchase amount per household observed in the exposed and control households/groups making purchases through a given channel prior to a campaign; and (II) the average purchase amount per household observed in a panel of households ('panel data') making purchases through a given channel or outlet prior to the campaign. In some embodiments, the purchase amount is for a particular product. In some embodiments, the purchase amount is for a particular retailer, i.e., for all transactions at the retailer. Generally, panel data can be any data of phenomena, behavior, and/or any activity associated with individual or group entities (e.g. households) that is known and can be used to control for data that cannot otherwise be measured and/or observed. The panel data can be time based, and/or based on any other suitable parameter. In some embodiments, panel data can be sourced from any suitable study and/or database, and can be generally representative of n-dimensional data that permits accounting for purchasing behavior of a panel of households over time.

Using the panel data, the outlet factor-up value can be calculated by dividing the observed average purchase amount per household in the exposed and control households/groups making purchases through a given channel (e.g. grocery) prior to a campaign by the average purchase amount per household observed in the panel of households making purchases through the same channel prior to the campaign.

Further, the channel factor-up value can be calculated by dividing the observed average purchase amount per household in the exposed and control households/groups making purchases through a given channel (e.g. grocery) prior to a campaign by the average purchase amount per household observed in the panel of households making purchases through all other channels (i.e. not grocery) unaccounted for. In some embodiments, the purchase amounts, and accordingly the channel factor-up value, can reflect purchases prior to the campaign. In some embodiments, at least a portion of the post-campaign purchase information can be employed in calculating the channel factor-up value. In such embodiments, aspects of the invention can account for known factors that will likely affect the post-campaign purchase information and should be accounted for. For example, if the promoted entity is a paper calendar product or a tax filing service, then it is likely to see a spike in sales at the beginning of every year, irrespective of the campaign. If the campaign for the promoted entity starts on January 1, then post-New Year purchasing information can be accounted for to provide a more accurate estimate of the channel factor-up value that can be applied in determining advertising effectiveness of the promoted entity in the post-New Year's period. As noted earlier, in some embodiments, information used to calculate the channel factor-up value can be made available directly by a manufacturer and/or distributor of the promoted entity.

The factor-up value can then be calculated by combining the cumulative effect reflected in the outlet-factor up value and the channel factor-up value in any suitable manner. In some embodiments, the factor-up value can be calculated by adding the outlet factor-up value and the channel factor-up value. In some embodiments, the factor-up value can be calculated by multiplying the outlet-factor up value and the channel factor-up value.

The total revenue lift that accounts for all traceable and untraceable purchases can be estimated by multiplying the measured revenue lift with the factor-up value.

As an illustrative and non-limiting example, consider a scenario where the observed average purchase amount per household of a promoted entity (e.g. a product) in the exposed and control households/groups making purchases through the grocery channel prior to an advertising campaign was $10, and the panel households spent $20 per year in grocery and another $30 per year in other channels on the same promoted entity, such as for the same product. Then, the outlet factor-up for the grocery outlet is $20/$10=2. Further, the channel factor-up for all other channels is $30/$10=3. When the factor-up value is calculated via multiplying the outlet factor-up and the channel factor-up, it has a value of 2+3=5. The total revenue lift is then=measured revenue lif*5. In other words, the calculated revenue lift accounts for just ⅕ or approximately 20% of all purchases for that product by exposed households based on the advertising campaign. In this manner, calculation of the factor-up value provides a more accurate understanding of revenues resulting from the advertising campaign.

Based on the discussions above, it is understood that in some embodiments, the measurement module 132 is configured to define a score for each consumer from a plurality of consumers, where the score can be based on (1) a purchase by a consumer, (2) a demographic value of the consumer, and (3) a retailer profile of the consumer. In some embodiments, the demographic value is household income. In some embodiments, the measurement module 132 defines the score for each particular consumer based on a number of digitally active consumers in a household of the particular consumer. Any suitable measure of digital activity can be employed that reflects the nature (e.g. amount of time, page hits, categories of websites being browsed, and so on) of the user's activity, and can further indicate whether the consumer and/or household is more or less likely to invest in the promoted entity. In this manner, digital activity of the consumer can be indicative of, but is not limited to, the likelihood that an opportunity to present the campaign to the user will actually arise (e.g. that an impression aimed at a consumer's social media profile will actually be rendered based on the consumer's social media usage), of how desirable a target the consumer is, of how likely it is for the consumer to receive impressions from other campaigns (e.g. a qualitative or quantitative measure of how 'eligible' and/or 'attractive' the consumer is to other campaigns), of how many campaigns are currently targeting and/or have previously targeted the consumer, and/or the like.

In some embodiments, the retailer profile (also termed 'first retailer profile') of the consumer is a grocery store category and a drug store category.

In some embodiments, the measurement module 132 is further configured to define a test group from the plurality of consumers that includes each consumer from the plurality of consumers that (1) was exposed to a communication for a promoted entity, and (2) includes a score within a range of scores. The test group can include information about a first purchase amount associated with the promoted entity. In some embodiments, the communication for the promoted entity is an offline advertisement for the promoted entity. In some embodiments, the score is a percentage, and the range of scores is less than about 10 percentage points. In some embodiments, the first purchase amount is associated with traceable purchasing activity of the test group for the promoted entity in the specified retailer profile.

In some embodiments, the measurement module 132 is further configured to define a control group from the plurality of consumers that includes each consumer from the plurality of consumers that (1) was not exposed to the communication for the promoted entity, and (2) includes a score within the range of scores, the control group including a second purchase amount associated with the promoted entity. In some embodiments, the second purchase amount is associated with traceable purchasing activity of the control group for the promoted entity in the specified retailer profile.

In some embodiments, the measurement module 132 is further configured to determine an initial effectiveness value based on (1) the first purchase amount and (2) the second purchase amount. In some embodiments, the initial effectiveness value is the measured revenue lift, and is calculated by subtracting the fourth purchase amount from the first purchase amount. The measurement module 132 can be further configured to send a signal indicative of a final effectiveness value to an entity of interest. The final effectiveness value is based on (1) the initial effectiveness value, and (2) a multiplier. The multiplier (also termed a 'first multiplier') can be based on a relationship between the first purchase amount and a third purchase amount from an opt-in group of consumers. In some embodiments, the opt-in group of consumers can be panel households, and the third purchase amount can be associated with traceable purchasing activity of the panel households for the promoted entity in the specified retailer profile. In some embodiments, the measurement module 132 is further configured to determine a second multiplier based on a relationship between the first purchase amount and a fourth purchase amount from an opt-in group of consumers. The fourth purchase amount can be associated with purchasing activity of the panel households in a second retailer profile that can be different from the first retailer profile.

The processor 122 can be any suitable processor configured to run and/or execute the module(s) included in the processor 122. Each module in the processor 122 can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 122) capable of performing one or more specific functions associated with that module. In some embodiments, the processor 122 can include other module(s) (not shown in FIG. 2) configured to perform other function(s) for the apparatus 120. For example, the processor 122 can include a visualization module configured to generate different views of the household data in the database 140, of the total revenue lift for subpopulations of interest, and/or the like.

In some embodiments, the memory 124 can be, for example, a random-access memory (RAM) (e.g., a dynamic RAM, a static RAM), a flash memory, a removable memory, and/or so forth. Information associated with performing the collection, matching, and/or measurement processes can be stored, maintained and updated in the memory 124. In some embodiments, the memory 124 encompasses the database 140. Additionally, although not shown in FIG. 2, other data or information can be stored in other portions of the memory 124. For example, instructions associated with maintaining contractual relationships between the system 100 and one or more of the data sources 150a-n can be stored in a non-transitory process-readable medium within the memory 124.

FIG. 4 is a flow chart illustrating a method 400 according to an embodiment. In some embodiments, the method 400 is for calculating the factor-up value for a promoted entity associated with an advertising campaign. The method 400 can be performed by the apparatus 120, or any apparatus structurally/functionally similar to the apparatus 120. Particularly, instructions associated with performing the method 400 can be stored in a memory of the apparatus (e.g., the memory 124 of the apparatus 120 in FIG. 2) and executed at a measurement module in a processor of the apparatus (e.g., the measurement module 132 in the processor 122 of the apparatus 120 in FIG. 2).

At 402, the measurement module 132 can be configured to define a test group from a population of consumers that have been exposed to a communication associated with a promoted entity. In some embodiments, the communication associated with the promoted entity can be an online and/or offline advertisement for the promoted entity. In some embodiments, the communication can have one or more of a video component, an audio component, a clickable web link, an interactive component such as a dialog, a pop-up, a banner, a skyscraper, rich media such as DHTML and embedded scripts, an interstitial, an email, a text message, and/or the like. In some embodiments, the communication can be an advertisement for the promoted entity that is optimized for play on a specific digital device, such as on a notebook, or on a smartphone application. In some embodiments, the consumers can be households, and the test group can constitute exposed households. In some embodiments, the consumers can be individuals and the test group constitutes exposed individuals. In some embodiments, the consumers can be mobile phone users of a particular smartphone application, and the test group constitutes exposed mobile phone users. In some embodiments, the consumers are mobile phone users of a particular smartphone application, and the test group constitutes exposed mobile phone users. In some embodiments, the consumers are any entity having specific properties of demographics, psychographics, behavior (such as purchase history), firmographic variables, and/or the like; then, the test group constitutes exposed entities.

In some embodiments, the population of consumers can be obtained and/or otherwise defined from a matched consumer record that includes each record from a first consumer record set that has a hashed attribute string equal to a hashed attribute string of a record from a second consumer record set. In some embodiments, the first consumer record set and the second consumer record set can be associated with campaign data and transaction data respective, and the hashed attribute string is an HHID used to match the two to generate the matched consumer record.

The test group can include the following information: (1) a retailer profile, and (2) a first purchase amount associated with the promoted entity. In some embodiments, the retailer profile (also referred to as a 'first retailer profile') is associated with the channel of purchase of the promoted entity. In some embodiments, the retailer profile can be one or more of mass market retailer category, grocery retailer category, drug store retailer category, wholesale retailer category, any suitable retail category as established by the North American Industry Classification System (NAICS), and/or the like. In some embodiments, the first purchase amount can be associated with traceable purchasing activity of the exposed households for the promoted entity in the specified retailer profile. In some embodiments, the first purchase amount is zero; in other words, the exposed households have no traceable purchasing activity for the promoted entity, and can be households selectively targeted by the campaign for purposes of gaining new customers.

At 404, the measurement module 132 can be configured to receive purchase information associated with a third party. In some embodiments, the third party can be an opt-in panel group of consumers, such as a panel group of households. In some embodiments, the third party can be a manufacturer. The purchase information can include (1) a second purchase amount associated with the promoted entity, and (2) a third purchase amount associated with the promoted entity. In some embodiments, the second purchase amount can be associated with traceable purchasing activity of the panel households for the promoted entity in the specified retailer profile. In some embodiments, the third purchase amount can be associated with purchasing activity of the panel households in a second retailer profile that can be different from the first retailer profile.

At 406, the measurement module 132 can be configured to define a first multiplier based on a relationship between the first purchase amount and the second purchase amount. In some embodiments, the first multiplier can be an outlet factor-up value, and is obtained by dividing the second purchase amount by the first purchase amount. At 408, the measurement module 132 can be further configured to define a second multiplier based on a relationship between the first purchase amount and the third purchase amount. In some embodiments, the second multiplier can be a channel factor-up value, and is obtained by dividing the third purchase amount by the first purchase amount.

At 410, the measurement module 132 can be configured to send, transmit, and/or otherwise indicate a combined multiplier to any entity of interest. The combined multiplier can be based on the first multiplier and the second multiplier. In some embodiments, the combined multiplier is the factor-up value, and is calculated by adding the first multiplier and the second multiplier. In some embodiments, the combined multiplier can be the factor-up value, and is calculated by multiplying the first multiplier and the second multiplier.

In some embodiments, the measurement module 132 is further configured to define a control group from a population of consumers that have not been exposed to the communication. In some embodiments, the control group can constitute unexposed households. The control group can include information associated with the first retailer profile, and a fourth purchase amount associated with the promoted entity. In some embodiments, the fourth purchase amount can be associated with traceable purchasing activity by the control group for the promoted entity in the first retailer profile.

The measurement module 132 can be further configured to determine an initial effectiveness value based on (1) the first purchase amount and (2) the fourth purchase amount. In some embodiments, the initial effectiveness value can be the measured revenue lift, and is calculated by subtracting the fourth purchase amount from the first purchase amount. The measurement module 132 can be further configured to send a signal indicative of a final effectiveness value to an entity of interest. The final effectiveness value can be based on (1) the initial effectiveness value, and (2) the combined multiplier. In some embodiments, the final effectiveness value ca be the total revenue lift, and is calculated by multiplying the initial effectiveness value (e.g. the measured revenue lift) and the combined multiplier (e.g. the factor-up value).

In some embodiments, a non-transitory processor-readable medium (e.g. the memory 124 of the apparatus 120 of FIG. 2) stores code representing instructions to cause a processor (e.g. the processor 122 of the apparatus 120 of FIG. 2) to perform a process. In some embodiments, the process can calculate the factor up value for a promoted entity associated with an advertising campaign. FIG. 5 illustrates an operation 500 of the code, according to an embodiment. The code represents instructions to, at 502; define a test group from a population of consumers that have been exposed to an advertisement for a promoted entity. In some embodiments, the consumers are households, and the test group is a group of exposed households. In some embodiments, the code further represents instructions for obtaining and/or otherwise defining the population of consumers from a matched consumer record that includes each record from a first consumer record set that has a hashed attribute string equal to a hashed attribute string of a record from a second consumer record set. In some embodiments, the first consumer record set and the second consumer record set are associated with campaign data and transaction data respective, and the hashed attribute string is an HHID used to match the two to generate the matched consumer record.

The test group can include the following information: (1) a retailer profile, and (2) a first purchase amount associated with the promoted entity. In some embodiments, the retailer profile (also referred to as a 'first retailer profile') can be associated with the channel of purchase of the promoted entity. In some embodiments, the retailer profile can be mass market retailer category. In some embodiments, the retailer profile can be grocery retailer category. In some embodiments, the first purchase amount can be associated with purchases of the promoted entity (e.g. of a product and/or at a retailer) made through a loyalty card program, and can be traceable. In some embodiments, the first purchase amount can include purchases of the promoted entity made through an offline retailer, and can be still made available as traceable purchasing activity by a contractual relationship with the offline retailer.

The code also represents instructions to, at 504, define a control group from a population of consumers that have not been exposed to the advertisement for the promoted entity. In some embodiments, the control group can constitute unexposed households. The control group can include information associated with the first retailer profile, and a second purchase amount associated with the promoted entity. In some embodiments, the second purchase amount can be associated with traceable purchasing activity by the control group for the promoted entity in the first retailer profile.

The code also represents instructions to, at 506, receive purchase information associated with a third party. In some embodiments, the third party can be an opt-in panel group of consumers, such as a panel group of households. In some embodiments, the third party can be a manufacturer. The purchase information can include (1) a third purchase amount associated with the promoted entity, and (2) a fourth purchase amount associated with the promoted entity. In some embodiments, the third purchase amount can be associated with traceable purchasing activity of the panel households for the promoted entity in the specified retailer profile. In some embodiments, the fourth purchase amount can be associated with purchasing activity of the panel households in a second retailer profile that can be different from the first retailer profile.

The code also represents instructions to, at 508, define a first multiplier based on a relationship between the first purchase amount and the third purchase amount. In some embodiments, the first multiplier is an outlet factor-up value, and is obtained by dividing the third purchase amount by the first purchase amount. At 410, the code further represents instructions to define a second multiplier based on a relationship between the first purchase amount and the fourth purchase amount. In some embodiments, the second multiplier can be a channel factor-up value, and is obtained by dividing the fourth purchase amount by the first purchase amount.

The code also represents instructions, at 510, to send, transmit, and/or otherwise indicate a combined multiplier to any entity of interest. The combined multiplier can be based on the first multiplier and the second multiplier. In some embodiments, the combined multiplier can be the factor-up value, and is calculated by adding the first multiplier and the second multiplier. In some embodiments, the combined multiplier can be the factor-up value, and is calculated by multiplying the first multiplier and the second multiplier.

In some embodiments, the code also represents instructions to determine an initial effectiveness value based on (1) the first purchase amount and (2) the second purchase amount. In some embodiments, the initial effective value can be the measured revenue lift, and is calculated by subtracting the second purchase amount from the first purchase amount. The code can further represent instructions to send a signal indicative of a final effectiveness value to an entity of interest. The final effectiveness value can be based on (1) the initial effectiveness value, and (2) the combined multiplier. In some embodiments, the final effectiveness value can be the total revenue lift, and is calculated by multiplying the initial effectiveness value (e.g. the measured revenue lift) and the combined multiplier (e.g. the factor-up value).

The methods described herein are examples of how to implement factor-up value evaluation, and further, how to implement total revenue lift evaluation for determining advertising effectiveness. It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to devices (e.g., wireless access points, mobile communication devices) with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A system comprising:
   one or more hardware processors;
   one or more computer readable media that storing a sequence of instruction that, when executed by the one or more hardware processors cause:
   collecting, by a collection module from a first set of one or more servers, a set of campaign data, associated with an online campaign, wherein the campaign data maps household information for a plurality of households to digital activity metrics;
   populating, by the collection module, a set of records in a database with information extracted from the campaign data, each respective record in the set of records storing information for a different respective household of the plurality of households including one or more digital activity metrics associated with the respective household, wherein the database is accessible to a matching module and the collection module removes personal identifiable information from the campaign data prior to populating the database with information extracted from the campaign data;
   for each respective record in the database, generating, by the collection module, a respective anonymous identifier by hashing an attribute string comprising a plurality of attributes extracted from the campaign data and associated with a respective household of the plurality of households;
   encrypting each anonymous identifier in the database with an encryption key;
   collecting, by the collection module from a second set of one or more servers, a set of transaction data that maps household information for a particular household of the plurality of households to one or more offline activity metrics;
   hashing, by the collection module, an attribute string extracted from the transaction data and encrypting the hashed attribute string with the encryption key used to encrypt the anonymous identifiers;
   matching, by the matching module, the transaction data to a record in the set of records by comparing the hashed attribute string encrypted by the encryption key to anonymous identifiers generated by the collection module and encrypted by the encryption key, wherein the matching module is prevented from directly interacting with the first set of one or more servers and the second set of one or more servers;
   in response to matching transaction data to the record in the set of records, generating a combined record in the database that links one or more digital activity metrics to one or more offline activity metrics for an anonymous household represented by the anonymous identifier.

2. The system of claim 1, further comprising a measurement module that generates a score based on at least one of a household income or a digital activity measurement.

3. The system of claim 1, further comprising a measurement module configured to define a score for each household from the plurality of households based on at least one of a number of digitally active consumers in a household, amount of time spent online, or number of categories of websites browsed.

4. The system of claim 1, further comprising a measurement module configured to:
   partition, using a logistic regression model, the set of records in the database into a plurality of clusters, including a first cluster and a second cluster, wherein the first cluster includes records for households from the plurality of households that (1) were exposed to a communication for a promoted entity, and (2) were assigned a score within a range of scores, wherein the second cluster includes records for households from the plurality of households that (1) were not exposed to the communication for the promoted entity, and (2) were assigned a score within the range of scores;

determine an initial effectiveness value for the online campaign based on comparing data associated with the first cluster of records with data associated with the second cluster of records in the database;

determine a combined multiplier based on a relationship between the first cluster and the second cluster; and determine a final effectiveness value for the online campaign by multiplying the initial effectiveness value by the combined multiplier.

5. The system of claim 4, wherein the measurement module is further configured to send a signal indicative of the final effectiveness value obtained through the measurement module by multiplying the initial effectiveness value by the combined multiplier.

6. The system of claim 1, further comprising a visualization module configured to generate different views of household data stored in the combined record.

7. The system of claim 1, further comprising a measurement module configured to:

partition, in the database based on a set of alignment characteristics, the set of records into a set of clusters;

partition each cluster in the set of clusters into a plurality of sub-groups using a logistic regression model;

performing one or more diagnostic modifications by removing outlier records from at least one cluster in the set of clusters.

8. A method, comprising:

collecting, by a collection module from a first set of one or more servers, a set of campaign data, associated with an online campaign, wherein the campaign data maps household information for a plurality of households to digital activity metrics;

populating, by the collection module, a set of records in a database with information extracted from the campaign data, each respective record in the set of records storing information for a different respective household of the plurality of households including one or more digital activity metrics associated with the respective household, wherein the database is accessible to a matching module and the collection module removes personal identifiable information from the campaign data prior to populating the database with information extracted from the campaign data;

for each respective record in the database, generating, by the collection module, a respective anonymous identifier by hashing an attribute string comprising a plurality of attributes extracted from the campaign data and associated with a respective household of the plurality of households;

encrypting each anonymous identifier in the database with an encryption key;

collecting, by the collection module from a second set of one or more servers, a set of transaction data that maps household information for a particular household of the plurality of households to one or more offline activity metrics;

hashing, by the collection module, an attribute string extracted from the transaction data and encrypting the hashed attribute string with the encryption key used to encrypt the anonymous identifiers;

matching, by the matching module, the transaction data to a record in the set of records by comparing the hashed attribute string encrypted by the encryption key to anonymous identifiers generated by the collection module and encrypted by the encryption key, wherein the matching module is prevented from directly interacting with the first set of one or more servers and the second set of one or more servers;

in response to matching transaction data to the record in the set of records, generating a combined record in the database that links one or more digital activity metrics to one or more offline activity metrics for an anonymous household represented by the anonymous identifier.

9. The method of claim 8, further comprising generating, by a measurement module, a score based on at least one of a number of digitally active consumers in a household, amount of time spent online, or number of categories of websites browsed.

10. The method of claim 8, further comprising defining a score for each household from the plurality of households based on at least one of a number of digitally active consumers in a household, amount of time spent online, or number of categories of web sites browsed.

11. The method of claim 8, further comprising:

partition, by a measurement model using a logistic regression model, the set of records in the database into a plurality of clusters, including a first cluster and a second cluster, wherein the first cluster includes records for households from the plurality of households that (1) were exposed to a communication for a promoted entity, and (2) were assigned a score within a range of scores, wherein the second cluster includes records for households from the plurality of households that (1) were not exposed to the communication for the promoted entity, and (2) were assigned a score within the range of scores;

determining, by the measurement module, an initial effectiveness value for the online campaign based on comparing data associated with the first cluster of records with data associated with the second cluster of records in the database;

determining, by a measurement module, a combined multiplier based on a relationship between the first cluster and the second cluster; and determining, by a measurement module a final effectiveness value for the online campaign by multiplying the initial effectiveness value by the combined multiplier.

12. The method of claim 11, sending a signal indicative of the final effectiveness value obtained through the measurement module by multiplying the initial effectiveness value by the combined multiplier.

13. The method of claim 8, further comprising generating, by a visualization module, different views of household data stored in the combined record.

14. A non-transitory processor-readable medium storing code representing instructions to cause a processor to perform a process, the code comprising code to:

collect, by a collection module from a first set of one or more servers, a set of campaign data, associated with an online campaign, wherein the campaign data maps household information for a plurality of households to digital activity metrics;

populate, by the collection module, a set of records in a database with information extracted from the campaign data, each respective record in the set of records storing information for a different respective household of the plurality of households including one or more digital activity metrics associated with the respective household, wherein the database is accessible to a matching module and the collection module removes personal identifiable information from the campaign data prior to populating the database with information extracted from the campaign data;

for each respective record in the database, generate, by the collection module, a respective anonymous identifier by hashing an attribute string comprising a plurality of attributes extracted from the campaign data and associated with a respective household of the plurality of households;

encrypt each anonymous identifier in the database with an encryption key;

collect, by the collection module from a second set of one or more servers, a set of transaction data that maps household information for a particular household of the plurality of households to one or more offline activity metrics;

hash, by the collection module, an attribute string extracted from the transaction data and encrypt the hashed attribute string with the encryption key used to encrypt the anonymous identifiers;

match, by the matching module, the transaction data to a record in the set of records by comparing the hashed attribute string encrypted by the encryption key to anonymous identifiers generated by the collection module and encrypted by the encryption key, wherein the matching module is prevented from directly interacting with the first set of one or more servers and the second set of one or more servers;

in response to matching transaction data to the record in the set of records, generating a combined record in the database that links one or more digital activity metrics to one or more offline activity metrics for an anonymous household represented by the anonymous identifier.

15. The non-transitory processor-readable medium storing code representing instructions to cause a processor to perform a process of claim 14, the process further comprising code to generate, by a measurement module, a score based on at least one of a number of digitally active consumers in a household, amount of time spent online, or number of categories of websites browsed.

16. The non-transitory processor-readable medium storing code representing instructions to cause a processor to perform a process of claim 14, the process further comprising code to generate, by a measurement module, a score for each household from the plurality of households based on at least one of a number of digitally active consumers in a household, amount of time spent online, or number of categories of websites browsed.

17. The non-transitory processor-readable medium storing code representing instructions to cause a processor to perform a process of claim 14, the process further comprising code to:

partition, using a logistic regression model, the set of records in the database into a plurality of clusters, including a first cluster and a second cluster, wherein the first cluster includes records for households from the plurality of households that (1) were exposed to a communication for a promoted entity, and (2) were assigned a score within a range of scores, wherein the second cluster includes records for households from the plurality of households that (1) were not exposed to the communication for the promoted entity, and (2) were assigned a score within the range of scores;

determine, by a measurement module, an initial effectiveness value for the online campaign based on comparing data associated with the first cluster of records with data associated with the second cluster of records in the database;

determine, by a measurement module, a combined multiplier based on a relationship between the first cluster and the second cluster; and determine, by a measurement module a final effectiveness value for the online campaign by multiplying the initial effectiveness value by the combined multiplier.

18. The non-transitory processor-readable medium storing code representing instructions to cause a processor to perform a process of claim 17, the process further comprising code to: send a signal indicative of the final effectiveness value obtained through the measurement module by multiplying the initial effectiveness value by the combined multiplier.

19. The non-transitory processor-readable medium storing code representing instructions to cause a processor to perform a process of claim 14, the process further comprising code to: generate, by a visualization module, different views of household data stored in the combined record.

* * * * *